(12) United States Patent
Goodfriend et al.

(10) Patent No.: US 10,339,827 B2
(45) Date of Patent: Jul. 2, 2019

(54) COMPUTER-IMPLEMENTED SYSTEM AND METHOD FOR ADMINISTERING AN EXAMINATION

(71) Applicant: GraphR Applications, LLC, Houston, TX (US)

(72) Inventors: Elizabeth Rose Goodfriend, Houston, TX (US); Pawankumar Jajoo, Houston, TX (US); Gilberto Galen Briscoe-Martinez, Houston, TX (US)

(73) Assignee: GraphR Applications, LLC, Houston, TX (US)

( * ) Notice: Subject to any disclaimer, the term of this patent is extended or adjusted under 35 U.S.C. 154(b) by 171 days.

(21) Appl. No.: 15/340,589

(22) Filed: Nov. 1, 2016

(65) Prior Publication Data

US 2017/0256174 A1 Sep. 7, 2017

Related U.S. Application Data

(60) Provisional application No. 62/303,559, filed on Mar. 4, 2016.

(51) Int. Cl.
*G09B 7/00* (2006.01)
*G09B 7/02* (2006.01)
*H04W 24/08* (2009.01)
*H04W 8/22* (2009.01)

(52) U.S. Cl.
CPC .............. *G09B 7/02* (2013.01); *H04W 24/08* (2013.01); *H04W 8/22* (2013.01)

(58) Field of Classification Search
CPC .. G09B 7/00; G09B 7/02; G06F 15/02; G06F 15/0225
See application file for complete search history.

(56) References Cited

U.S. PATENT DOCUMENTS

| | | | |
|---|---|---|---|
| 6,944,568 B1 * | 9/2005 | Corarito | G06F 11/3688 702/123 |
| 8,789,197 B1 * | 7/2014 | Wolfram | G09C 5/00 380/279 |
| 2006/0099965 A1 * | 5/2006 | Aaron | H04M 1/72572 455/456.3 |
| 2006/0277233 A1 * | 12/2006 | Miller | G06F 15/16 708/160 |
| 2007/0050432 A1 * | 3/2007 | Yoshizawa | G06F 15/0283 708/130 |
| 2008/0154997 A1 * | 6/2008 | Aton | G09B 5/00 708/130 |
| 2009/0215020 A1 * | 8/2009 | Roschelle | H04L 67/06 434/362 |

(Continued)

*Primary Examiner* — Peter R Egloff
(74) *Attorney, Agent, or Firm* — Garlick & Markison; Bruce E. Stuckman

(57) ABSTRACT

An examination processing system for use with a corresponding mobile device associated with a user taking an examination is operable to receive calculator parameter data from an examination server via a network. An interactive calculator interface is displayed on the mobile device, and the interactive calculator interface performs an approved set of calculator functions indicated by the calculator parameter data. An unapproved activity notification is generated for transmission to the examination server via the network in response to detecting unapproved activity on the mobile device.

16 Claims, 8 Drawing Sheets

Examination Administering System 100

(56) References Cited

U.S. PATENT DOCUMENTS

| | | | |
|---|---|---|---|
| 2010/0198891 A1* | 8/2010 | Rea | G06F 15/16 |
| | | | 708/130 |
| 2012/0041993 A1* | 2/2012 | Wostrel | G06F 8/71 |
| | | | 708/130 |
| 2013/0122481 A1* | 5/2013 | Rovner | G09B 7/02 |
| | | | 434/350 |
| 2014/0068236 A1* | 3/2014 | de Brebisson | G06F 15/02 |
| | | | 713/1 |
| 2014/0272882 A1* | 9/2014 | Kaufman | G09B 5/065 |
| | | | 434/308 |
| 2015/0213722 A1* | 7/2015 | Nypl | G09B 7/00 |
| | | | 705/12 |

* cited by examiner

US 10,339,827 B2

COMPUTER-IMPLEMENTED SYSTEM AND METHOD FOR ADMINISTERING AN EXAMINATION

CROSS-REFERENCE TO RELATED APPLICATIONS

The present U.S. Utility patent application claims priority pursuant to 35 U.S.C. § 119(e) to U.S. Provisional Application No. 62/303,559, entitled "COMPUTER-IMPLEMENTED SYSTEM AND METHOD FOR ADMINISTERING AN ACADEMIC TEST", filed Mar. 4, 2016, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to knowledge based systems used in conjunction with client/server network architectures. This invention also relates to computer-implemented systems and method dedicated to the field of education.

DETAILED DESCRIPTION OF THE INVENTION

Figure 1:
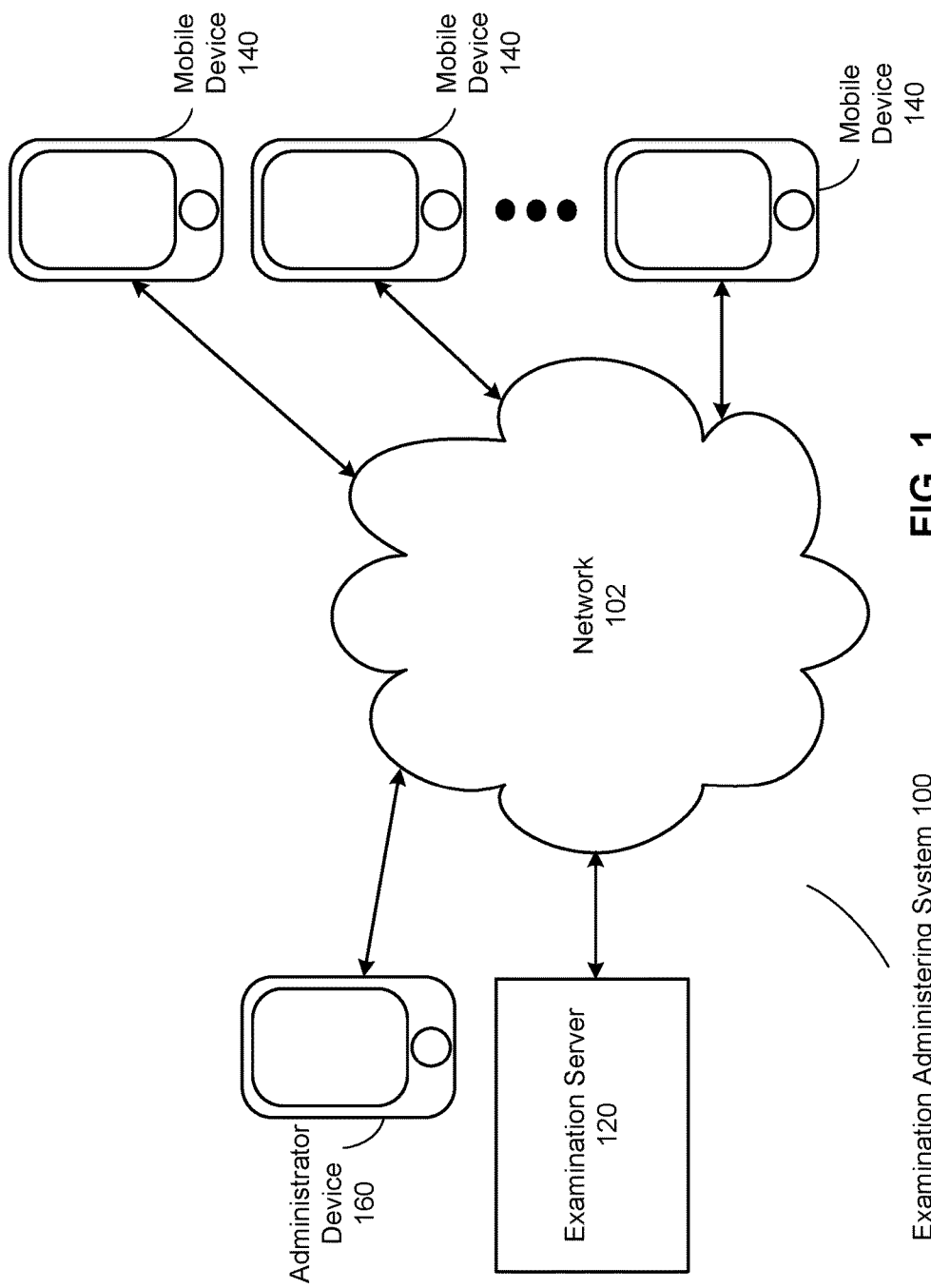
FIG. 1 is a schematic block diagram of an embodiment of the present invention.

FIG. 1 is a schematic block diagram of an examination administering system 100 that includes an examination server 120, a plurality of mobile devices 140, and at least one administrator device 160, all connected via a network 102, which can include one or more wireless and/or wire lined communication systems; one or more private intranet systems and/or public internet systems; one or more local area networks (LAN) and/or wide area networks (WAN); and/or the Internet. Each mobile device 140 and administrator device 160 can include a cellphone, smartphone, tablet, personal computer, laptop, or other computing device. Users of the examination administering system can interact with their respective mobile device and/or administrator device by entering input via a touchscreen, computer mouse, keyboard, buttons, microphone and speaker, touchpad, etc., associated with the device, and can view notifications, menu options and/or interactive interfaces via a touchscreen, monitor, or display device associated with the device. In various embodiments, the examination administering system of FIG. 1 is directed to administering an examination. The administrator device 160 can be used by an administrator, teacher, professor, and/or proctor of the examination, and each mobile device 140 can be used by a student taking an examination. Hereafter, users of the administrator device 160 and mobile devices 140 will be referred to administrators or students, respectively.

Figure 2B:
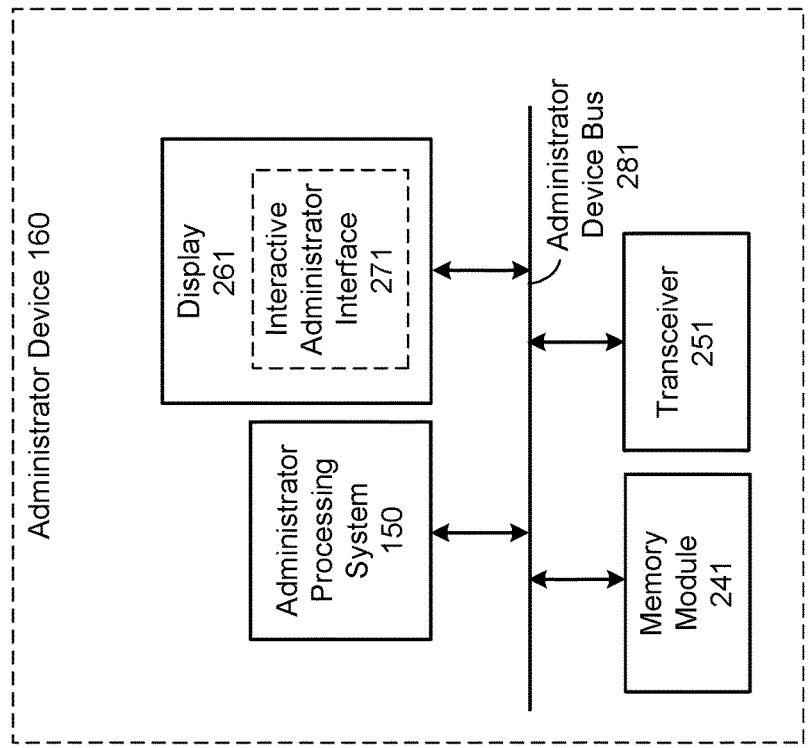
FIGS. 2A and 2B are schematic block diagrams of a mobile device and an administrator device, respectively, in accordance with the present invention.
Figure 2A:
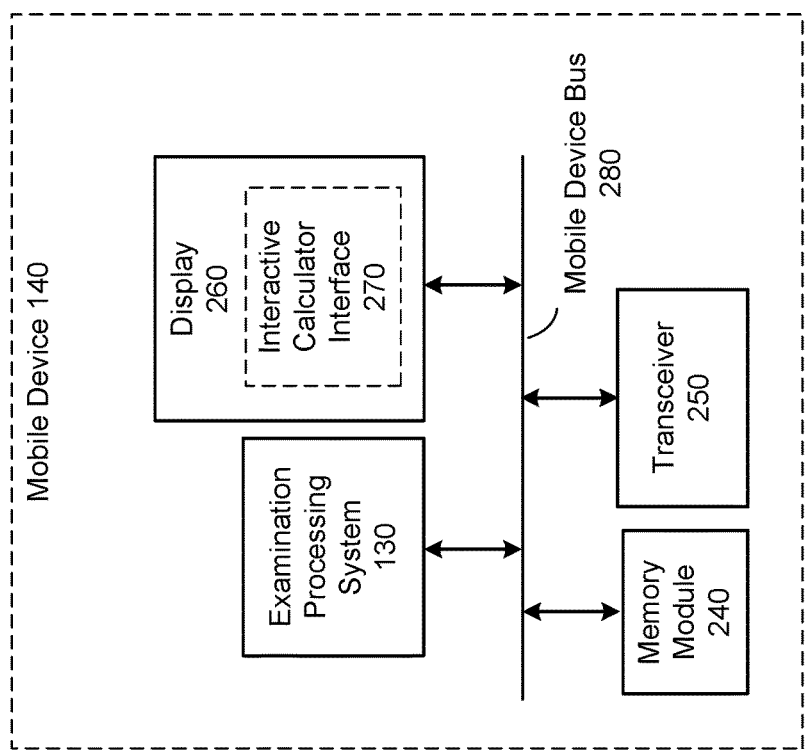

FIG. 2A is a schematic block diagram of mobile device 140 of FIG. 1. Mobile device 140 includes an examination processing system 130, a memory module 240, a transceiver 250, and a display 260, which can display an interactive calculator interface 270. The examination processing system 130 can be implemented via a processor or other processing device and can operate to execute operational instructions stored in the memory module 240. The display 260 can be implemented via an interactive touch screen or other interactive display. The transceiver 250 can be implemented via a wireless local area network transceiver, a cellular data transceiver or other wireless transceiver capable of communication with a network such as network 102. These components are connected via mobile device bus 280.

FIG. 2B is a schematic block diagram of administrator device 160 of FIG. 1. Administrator device 160 includes an administrator processing system 150, a memory module 241, a transceiver 251, and a display 261, which can display interactive administrator interface 271. These components are connected via administrator device bus 281. The administrator processing system 150 can be implemented via a processor or other processing device and can operate to execute operational instructions stored in the memory module 241. The display 261 can be implemented via an interactive touch screen or other interactive display. The transceiver 251 can be implemented via a wireless local area network transceiver, a cellular data transceiver or other wireless transceiver capable of communication with a network such as network 102. In various embodiments the examination server presents a website that can operate via a browser application of mobile device 140 and administrator device 160 or via applications stored in memory modules 240 and 241 of the mobile device 140 and administrator device 160 respectively. In various embodiments, memory modules 240 and 241 can store unique applications directed towards students taking examinations and users administering examinations respectively.

Figure 3:
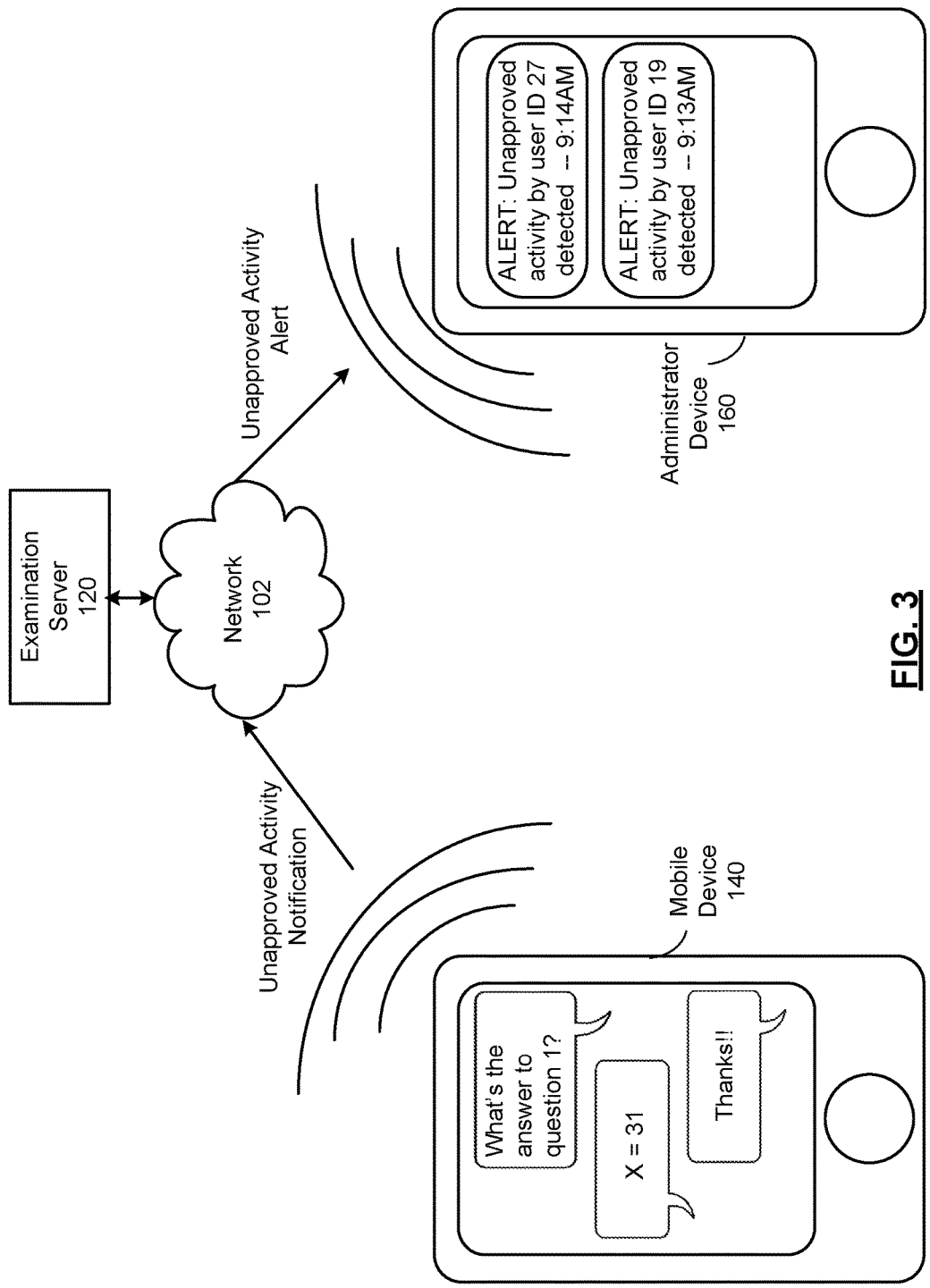
FIG. 3 is a schematic block diagram of an embodiment of the present invention.

FIG. 3 is a schematic block diagram of an embodiment of the present invention. In various embodiments, each examination processing system 130 can detect unapproved/unauthorized activity on the corresponding mobile device 140 during an examination. For example, an exam administrator may be concerned about students cheating on an exam through use of their personal mobile device. In traditional classrooms, monitoring mobile device usage is difficult, especially in large classrooms. Most students own small mobile devices such as cellphones, smartphones, and/or tablets, and many students are proficient at surreptitious mobile device usage. During an exam, many students may be inclined to use their mobile device unethically, for example, by exchanging text messages with other students about exam questions, consulting the Internet for answers to exam questions, viewing a forbidden formula chart or cheat sheet, etc. The examination processing system can monitor activity by each student on their respective mobile devices during an examination, detect unapproved activity, and generate a notification for transmission to examination server 120 in response to detecting the unapproved activity. In various embodiments, the examination server 120, upon receiving a notification of unapproved activity, will automatically send an alert transmission to the administrator device. The administrator processing system will alert the user in response to receiving the alert transmission by automatically displaying alert data on the administrator device and/or generating a sound and/or vibration by the administrator device. In various embodiments, an administrator can request access to unapproved activity notifications via user input to the administrator device, and unapproved activity notification data can be fetched from the examination server. In various embodiments, the examination server can automatically send aggregated unapproved activity data received from multiple mobile devices to the administrator processing system 150 at fixed intervals and/or at the conclusion of the exam. Each examination processing system associated with a corresponding student's mobile device can generate and transmit notifications indicating unapproved activity to the examination server in real time as the unapproved activity is detected, and/or at a set time, for example, at the conclusion of the examination.

In various embodiments, the set of unapproved activities to be monitored and reported by the examination processing system can be based on a predefined set, and/or a custom subset of possible activities selected by the exam administrator via user input to the administrator device, for example, via interactive administrator interface 271, for transmission to the examination server. This unapproved activities set can be sent from the examination server to examination processing systems associated with the exam. In various embodiments, the unapproved activity detected by the examination processing system can include, for example, exiting a mode and/or application associated with the examination processing system, which can include exiting interactive calculator interface 270. Unapproved activity can also include accessing other applications stored on the mobile device. In various embodiments, the examination processing system can monitor data traffic, network access, and/or packets transmitted and/or received by the mobile device. In various embodiments, the examination processing system can monitor user input to the mobile device, for example, keyboard input, buttons or toggles relating to settings and/or other applications, etc. In various embodiments, the examination processing system can monitor messaging services such as texting, email, and/or social media applications, and can detect when messages are sent and/or received as an indication of unapproved activity. In various embodiments, the examination processing system can determine if sent or received messages are unauthorized by evaluating message content, for example, by searching for key words associated with the examination and/or identifying the sender of the message by comparing the sender to a roster of students in the class and/or a list of mobile devices of the examination administering system. In various embodiments, the examination processing system will only report unauthorized activity if sent or received message content and/or message contact is deemed unauthorized, for example, flagging a text from another mobile device registered for the exam that says "The answer to question 4 is Lithium" and ignoring a text from Mom that says "I'll pick you up after school at 4 pm today."

In various embodiments, an administrator may require that only a particular wireless network is accessed, for example, a network associated with the academic institution where the examination is being administered, or a network associated with the administration of the exam itself. The approved wireless network can include network 102. In such embodiments, access to network 102 may be required and/or monitored by the examination processing system for the duration of the exam to allow the examination processing system to transmit unapproved activity notifications via network 102 in real time during the examination. In various embodiments, an administrator may require that no data and/or network access is available via students' mobile devices, and unapproved activity can include leaving a mode such as airplane mode and/or connecting to a network. In such embodiments, other data relating to the exam can be sent and received via network 102 before and/or after the exam. For example, an examination processing system can receive data pertaining to administering the exam, such as calculator parameters or question data for display by the mobile device as described in conjunction with later figures, before the start of the examination. The examination processing system can still monitor mobile device activity and can send one or more unapproved activity notifications at the conclusion of the exam, allowing the exam to be administered with no network connection, and the unapproved activity notifications can be transmitted automatically once a network connection is established after the conclusion of the exam.

In various embodiments, the application can monitor settings of the mobile device, and can determine for example, if network settings, airplane mode settings, do not disturb settings, notification settings, and/or application settings such as enabling push notifications are configured for one or more applications. In various embodiments, the examination processing system may require a certain setting configuration before a student is allowed to start an examination. For example, a student may be required disable push notifications and/or enter airplane mode before the examinations begins. In various embodiments, the examination processing system will automatically facilitate enabling and/or disabling the appropriate settings at the start of the examination.

In various embodiments, the examination processing system can generate an alert for display via the mobile device, and/or a vibration and/or sound made by the mobile device to notify the student taking the exam that they are engaging in unapproved activity. In various embodiments, this alert can indicate a warning, for example, allowing the student to cease the unapproved activity accordingly before the official unapproved activity notification is transmitted. In various embodiments, the examination processing system can generate an interface for display via the mobile device listing the set of unapproved activities and/or listing the set of required settings, for example, before or at the start of the examination, allowing students to ensure that they understand the rules for mobile device usage.

Figure 4:
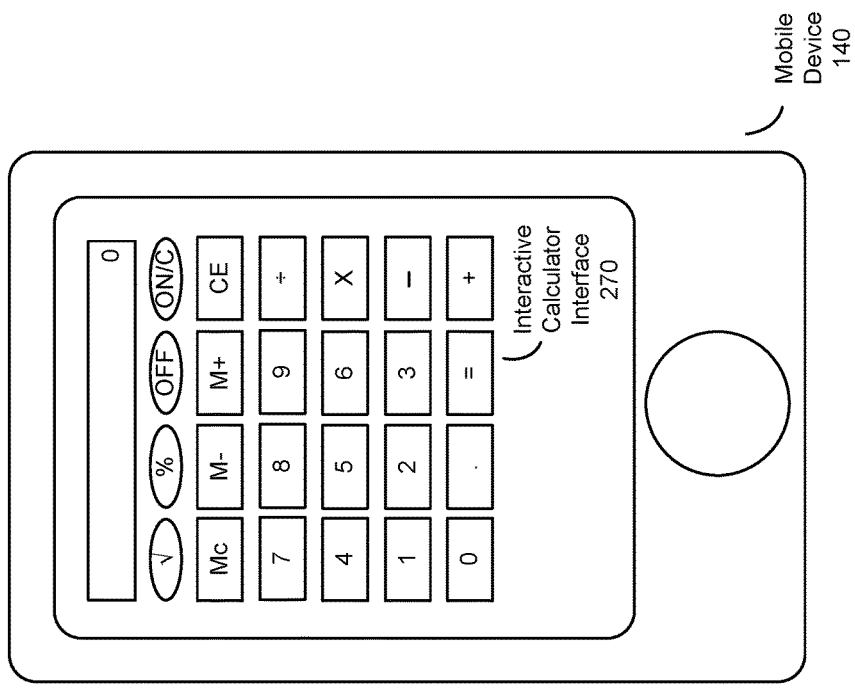
FIG. 4 is a graphical illustration of an example interactive calculator interface displayed on a mobile device in conjunction with various embodiments of the present invention.

FIG. 4 is a graphical illustration of an example interactive calculator interface 270 displayed on a mobile device 140 in conjunction with various embodiments of the present invention. In various embodiments, each examination processing system facilitates usage of an interactive calculator interface 270 displayed on the corresponding mobile device 140 for usage by the corresponding student during the exam. Furthermore, in various embodiments, the exam administrator can select, via user input to their administrator device, a set of allowed calculator functions that will be available to each student via their interactive calculator interface during the exam. This allows standardization and customization of calculator functionality for all students taking the examination. For example, an exam administrator may wish that all students taking the exam have access to the same set of calculator functions. Traditionally, this can be achieved through a set of identical classroom calculators or by requiring students to purchase a particular calculator model. The costs associated with requiring every student to have access to a particular calculator model can be expensive. Furthermore, standardization of available functions is not necessarily guaranteed when traditional calculators are used, as pre-programmed processes can be coded by students and/or loaded by students for storage onto several commercially available calculator models. Selecting a fixed set of functions made available to students on interactive calculator interfaces displayed on their own mobile devices, personal cellphones, is an ideal way for exam administrators to keep costs low while ensuring that all students have access the same set of calculator functions. Furthermore, the use of traditional calculators while taking examinations makes it difficult for an administrator to customize the set of available calculator functions. For example, an administrator may wish to customize the available calculator functions for different examinations, or even test questions, based on the material that is being tested. Limiting students to the use of a single traditional calculator over several exams, for example, over an academic year or the duration of a course, may provide students with too much or too little functionality, especially if the same calculator is used across multiple exams. For example, traditional graphing calculators often have a vast set of advanced functions that may be necessary testing some topics, but inappropriate for testing other topics. Conversely, a more basic calculator may not have functionality needed for more advanced topics tested in only parts of a course. In various embodiments, examination administrators can customize calculator functionality for different exams, or even enable different functionality between different questions on the same exam.

In various embodiments, such standardization and customization is achieved by user input to the administrator device, for example, via interactive administrator interface 271, allowing an administrator to select an allowed set of calculator functions for an examination for transmission by the administrator processing system to the examination server via network 102. Calculator parameter data detailing this set of approved set of calculator functions can be transmitted from the examination server to examination processing systems corresponding to each student taking the exam before and/or during the examination via network 102. The interactive calculator interface displayed by the examination processing system can provide corresponding functionality based on the received calculator parameter data.

In various embodiments, the administrator of the examination can include custom functions in the calculator parameter data. For example, the administrator may include a complicated exam question that requires multiple steps, and may wish to create a function to allow students to solve for some steps in an easier fashion. Such custom functions are also made available to students via the interactive calculator interface. Consider an examination question that first requires deriving parameters a, b, and c, and second requires using the quadratic formula given a, b, and c to solve for the final answer. The derivation of a, b, and c is the main learning objective of the question, and the administrator is not concerned with testing a students' memory of the quadratic formula itself. Though the quadratic formula is not a traditional calculator function, the administrator may include a custom function in the set of approved calculator functions that uses the quadratic formula to solve for x, given parameters a, b, and c. In various embodiments the administrator can program custom functions themselves, or can choose functions from a list of pre-programmed custom functions, for example, via a menu on an interface of the administrator device, by searching a database of functions, by loading a function created by a third-party, etc. In various embodiments, the administrator processing system can include a developing environment allowing the administrator to create custom calculator functions.

In various embodiments, the administrator may further wish to place limitations on pre-programmed functions and/or processes created by students. For example, an administrator may encourage students to program their own calculator functions for use on examinations as a learning tool. In various embodiments, the administrator can allow pre-programmed functions generated by a student. In other embodiments, the administrator can allow no pre-programmed functions, or allow only pre-programmed functions that fulfil a set of requirements. This can be indicated in the calculator parameter data.

In various embodiments, the calculator parameter data can indicate optional calculator functions that, if used, will induce a score penalty during scoring. For example, an administrator may choose to allow a particular calculator function, which can be a standard function or custom function, for students who may get stuck and/or forget a step in solving a complicated question. If a student uses the particular calculator function, their score will be penalized. Alternatively, in some embodiments, if a student doesn't use one of the optional calculator functions, they may receive extra credit during scoring. In various embodiments, the score penalty for use of the function can also be set by the administrator. Consider the previous example, where a question is included that requires use of the quadratic formula. A quadratic formula function can be included in the list of optional functions. A student may determine that they will likely miss the question if they do not remember how to use quadratic formula correctly, and may decide to use the optional quadratic formula function to correctly answer the question, while inducing the penalty.

Thus far, the interactive calculator interface discussed emulates a traditional calculator for the purpose of taking examinations that require use of mathematical operations and/or formulas. However, this functionality can be extended to different types of tools that students may require to take exams, for example, in other academic subjects. For example, the calculator interface can instead display textbook material, dictionary definitions, maps, the periodic table, a class website or third party website, a database, diagrams, poems or passages from novels, artistic works such as paintings or musical scores, etc. Such interfaces can also be interactive, and the set of approved functions can include, for example, allowing access to definitions to a subset of words in the dictionary, allowing students to obtain the atomic number or atomic mass from only a subset of elements in the periodic table, allowing students to read only selected chapters from textbook material, etc.

In various embodiments, the examination processing system can track the input to the interactive calculator interface by the student. The examination processing system can keep a log of the calculator input, and in some embodiments, can also log the calculator output for each function call to the calculator. In various embodiments, the examination processing system can track the calculator input for particular questions. In various embodiments, the examination processing system can transmit the log of calculator input and/or output to the examination server. In various embodiments, calculator log data can be transmitted automatically to the administrator device in real time and/or at the conclusion of the exam. In various embodiments, log data can instead be transmitted in response to a request by the administrator via user input to the administrator device, for example, requesting log data for a particular student who produced alarmingly wrong or suspiciously correct examination answers. In various embodiments, scoring a student's exam can be based on the log of calculator input, for example, to ensure that students followed the appropriate steps to arrive at their examination answers.

Figure 5:
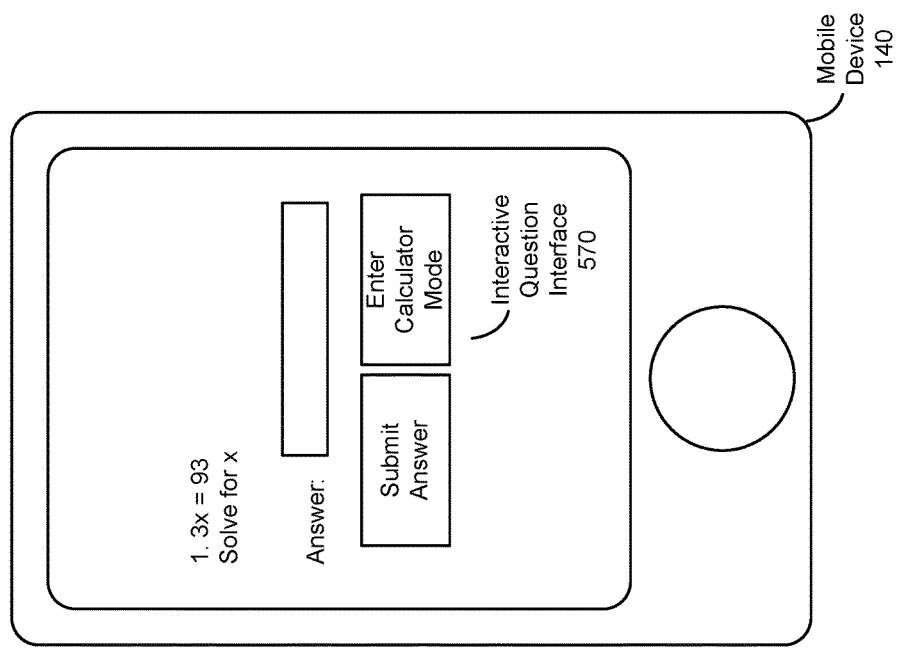
FIG. 5 is a graphical illustration of an example interactive question interface displayed on a mobile device in conjunction with various embodiments of the present invention.

FIG. 5 is a graphical illustration of an example interactive question interface 570 displayed on a mobile device 140 in conjunction with various embodiments of the present invention. While this novel system of administering exams can be used solely to control calculator functionality and/or monitor mobile device activity during a traditional pencil and paper exam, the system can be further used to administer the exam itself, for example, allowing students to receive exam questions on their mobile device, allow students to answer questions on their mobile device, and/or allow exams to be scored automatically. Such capabilities can allow parts of exam, or an entire exam, to be administered electronically while still controlling calculator functionality and/or monitoring unapproved activity.

In various embodiments, the administrator processing can generate question data corresponding to examination questions, for example, based on user input to administrator device 160 via interactive administrator interface 271, and can transmit this question data to the examination server. The examination processing system can receive question data pertaining to an exam from the examination server. The question data can include a plurality of examination questions created by the administrator or selected by the administrator from a preexisting set of questions. The administrator can create or select questions via interactive administrator interface 271 displayed by the administrator processing system on administrator device 160, and the administrator processing system can transmit the questions to the examination server. In such embodiments, the examination server can send question data to one or more examination processing systems associated with the exam, for example, along with the calculator parameter data before the start of the exam. The examination processing system can display an interactive question interface on the corresponding mobile device indicating at least one of a plurality of questions included in the question data. In some embodiments, all the questions are displayed at once. In other embodiments, one question is displayed at a time, and the student can enter input to the interface indicating they are ready to advance to the next question. In various embodiments, a student can choose to advance to any question in the exam, and can revisit questions. In other embodiments, the questions are displayed sequentially, and must be answered sequentially. In various embodiments, the interactive calculator interface is displayed on the same view simultaneously with one or more questions. In other embodiments, the student can transition to and from the interactive question interface and the interactive calculator interface, for example, by selecting a menu option.

In various embodiments, an exam may include questions that have different calculator functionality requirements. For example, an administrator can indicate that graphing functionality be available on question 1 of the exam, and that graphing functionality be prohibited in questions 2-5 of the exam. The differing calculator functionality question to question can set by the administrator and included in calculator parameter data. A first set of functions can be made available on the interactive calculator interface while a student is answering a first question. When the student advances to the next question, the interactive calculator interface can switch to a second set of functions. In various embodiments, the administrator may choose to require that the questions are displayed sequentially to ensure that a student doesn't use unapproved calculator functions for a first question that are, for example, made available on a second question by skipping around between questions freely.

In various embodiments, the interactive question interface allows the student to submit an answer to each question, and the submitted answers can be transmitted back to the examination server. Utilizing this functionality can allow an entire exam to be administered via each mobile device, requiring no paper, pencils, or other materials. In various embodiments, the student can submit answers as each question is displayed. In various embodiments, the interactive question interface will not advance to a new question until a question is submitted.

In various embodiments, the examination server stores answer key data corresponding to answers to the examination questions. The answer key data can be created by the administrator or selected from preexisting answers by the examination administrator via user input to the administrator device, and/or can be generated automatically based on computationally solving questions set by the examination administrator, and can be transmitted from the administrator device to the examination server. In various embodiments, answer key data is transmitted to one or more mobile devices associated with an exam. In various embodiments, answers are sent individually to a mobile device, one at a time, for each question in real-time as answers are submitted. In other embodiments, the answer data is transmitted all at once, for example at beginning of the examination along with the question data, or at the end of the examination. In various embodiments, different questions can be assigned different weights for scoring, and the answer key data can include question weighting data indicating these weights. In various embodiments, a student's exam can be scored automatically by the examination processing module based on the answer key data, which can be fetched from or automatically transmitted by the examination server. In various embodiments, the answer key data is never transmitted to the mobile devices, and the examination is instead scored by the examination server after the answer data is received from the examination processing system. In various embodiments, the examination server can generate exam statistics and/or curve examination scores based on the aggregate responses received from all students' mobile devices. In various embodiments, the examination server can transmit the answer data to the administrator processing system, and the exam can be scored by the administrator processing system. In various embodiments, the exam is scored in real-time as each question is answered. In various embodiments, the examination processing system can generate and/or display feedback data after each question is answered, or at the conclusion of the exam, indicating to the corresponding student that the question was answered correctly or incorrectly, showing the correct answer, and/or showing proper steps for calculating the correct answer.

In various embodiments, the answer key data includes solution method data, for example, indicating a method that includes one or more steps to solving the problem via the interactive calculator interface, for example, as an ordered list of calculator functions or calculator input necessary to solve the problem. In various embodiments where the examination processing system stores and/or transmits calculator log data, the exam can be further scored automatically based on comparing the calculator log data to the solution method data. For example, a student can be assigned partial credit if their logged calculator functions indicate that they performed a portion of the steps correctly. As another example, a student can lose points if their calculator log data indicates that although the correct answer was submitted, the method utilized was incorrect. In various embodiments, the administrator can view the calculator log data and manually assign and/or update scores based on the calculator log data.

In various embodiments, the examination processing system can receive time limit data pertaining to an exam from the examination server. In various embodiments, the time limit data is created by the administrator, for example, via an interface displayed by the administrator processing system on administrator device 160, and the administrator processing system can transmit the time limit data to the examination server. For example, the administrator may want to ensure that students have one hour to take the exam, and can set an exam time limit of one hour via user input to the administrator device. Time limit data can be sent to the mobile devices associated with the exam along with calculator parameter data and/or the unauthorized activities set. In response, the interactive calculator display can be active for a time corresponding to the time limit indicated in the time limit data, and/or the mobile device activity can be monitored for a time corresponding to the time limit data. Such an embodiment can be useful in the classroom, for example, to make sure that students cannot make additional computations while papers are being collected. Including time limit data can also be beneficial in embodiments where one or more students are taking the exam in a setting that isn't proctored by the administrator in person, for example, if the exam is a take-home examination, if one or more students need to make-up the exam in an unsupervised setting, if a substitute teacher is leading a class during the examination, etc.

In various embodiments a timer for the interactive calculator display begins when a student logs into a particular exam, opens an application corresponding to the interactive calculator interface, and/or enters the first input into the interactive calculator display. In various embodiments, the time limit can indicate a total time that the interactive calculator display can be active, and can account for breaks taken by the student. For example, a student may wish to enter an exam break mode to use the restroom. The interactive calculator display will be inactive until the student resumes the exam, and no exam time will be lost for the duration of the break. In some embodiments, the calculator parameter data can indicate whether or not breaks are allowed in an examination, can indicate a maximum number of breaks, can indicate a maximum amount of break time and/or indicate a mandatory break, for example, a lunch break between two exam segments. In other embodiments, the time limit for the interactive calculator display begins at a fixed time. For example, an administrator can indicate in calculator parameter data that the examination begins at 10 am and finishes at 11 am, and in response, the interactive calculator display will be active only between 10 am and 11 am.

In various embodiments, the time limit data can include time limits for multiple sets of calculator functions during the examination. For example, in a one-hour exam, a first set of calculator functions can be available for 20 minutes, and a second set of calculator functions can be available for 40 minutes. In various embodiments, the exam administrator can indicate if the multiple sets of calculator functions must be available in a certain sequence, and/or at certain fixed times. For example, the first set of calculator functions can be available for the first 20 minutes, or for example, starting at 10 am, and the second set of calculator functions can be available for the last 40 minutes, or starting at 10:20 am. In other embodiments, the administrator can allow the student to switch between calculator modes, so long as no calculator mode exceeds its corresponding time limit. For example, a student may wish to use the first set of calculator functions for the first 10 minutes, the second set of calculator functions for the next 40 minutes, and the last set of calculator functions for the last 10 minutes.

In various embodiments where the examination processing system also receives question data, the time limit data can be linked to the question data. For example, the time limit data can indicate that a student has 10 minutes for question 1, and 20 minutes for question 2. The time limit data can correspond to the questions being presented sequentially and/or in an order chosen by a student taking the examination. In various embodiments where questions are answered sequentially, the next question will automatically be displayed when time for the current question has elapsed.

In various embodiments, time limit data can be displayed on the mobile device as a countdown for total examination time remaining and/or time remaining for the current question. In various embodiments, a warning notification will be displayed when the exam time and/or current question time is close to elapsing.

In various embodiments, the actual time spent on individual questions and/or on the entire exam can be transmitted to the examination server for scoring purposes. For example, if a student finished a 1 hour exam in 45 minutes, they can receive bonus points during scoring. In various embodiments, the interactive calculator display will remain active and mobile device activity will be monitored beyond the time limit if the exam in not submitted by the student. In such embodiments, students can be penalized on their exam score for taking too long on particular questions or on the entire exam, but this may be favorable if they still manage to eventually submit overdue, yet correct, answers to exam questions.

Figure 6:
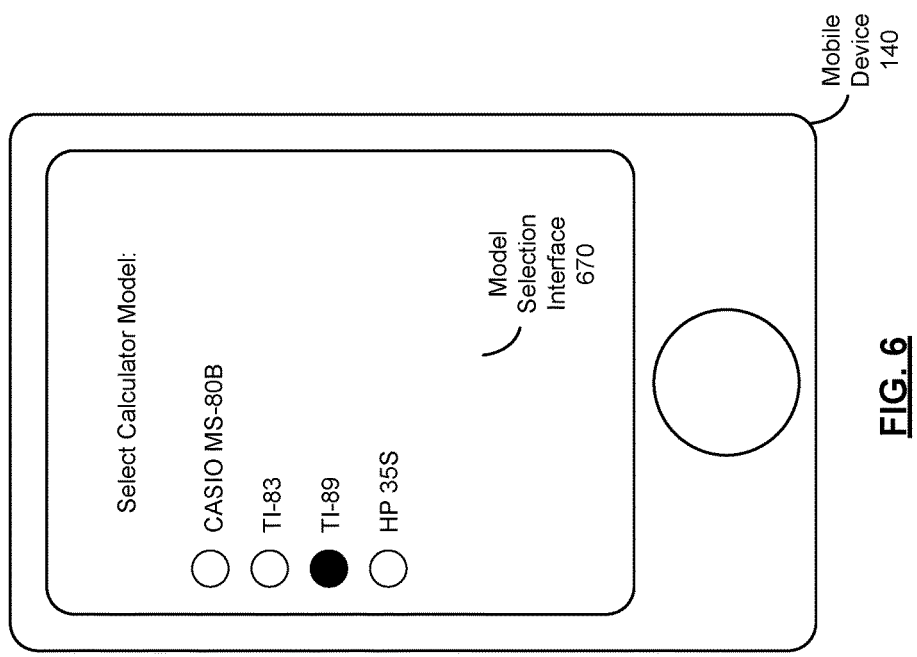
FIG. 6 is a graphical illustration of an example model selection interface displayed on a mobile device in conjunction with various embodiments of the present invention.

FIG. 6 is a graphical illustration of an example model selection interface 670 displayed on a mobile device 140 in conjunction with various embodiments of the present invention. In various embodiments, the student can select a custom format for the interactive calculator interface. The user can customize calculator display options such as color, layout, etc. In particular, the interactive calculator interface can be displayed to replicate an existing calculator model that the student is comfortable using. In various embodiments, the different calculator interface options can include allowing a user to enter different input to achieve the same functionality. For example, computing the 3rd root of 27 in one calculator model is achieved by entering 3, 27, √. In other models, this is achieved by entering √, 27, 3, or √(27,3). In various embodiments, input ordering entered to achieve various calculator functions is customizable. For example, the student can further select if they wish for their chosen calculator interface to perform as a single-step/immediate execution calculator, or as an expression/formula calculator. In various embodiments, the calculator parameter data can restrict the student from selecting calculator models that include functions that are not allowed for the examination. In other embodiments, the student can select any calculator model, but only the allowed functions indicated in the calculator parameter data will be active. In various embodiments, calculator functions that are not enabled on a particular model will be indicated on the interactive calculator interface. For example, if the natural log function is not an allowed function, the corresponding button on the interactive calculator display can, for example, be highlighted in red, have an 'X' covering the button, etc. This allows a student to quickly see which functions are not allowed. In various embodiments, a student can select one or more favorite calculator models as a user preference.

In various embodiments, a particular calculator model may not be available, or the student wish to create their own custom calculator layout. For example, a student may wish to use a TI-89, which might not be available as an interactive calculator interface option. The examination processing system can allow the student to upload an image of a TI-89, and then map each of a set of functions to a range of pixels in the image, for example, indicating the pixels of the corresponding button for the function in the image. A second student may wish to create their own custom calculator layout, perhaps wishing to place a very large, multiplication button in the middle of the display because they tend to use multiplication often. The examination processing system can allow the student to "draw" their own custom calculator by arranging and sizing buttons corresponding to each of a set of functions, for example, via an interactive interface on the mobile device.

Figure 7:
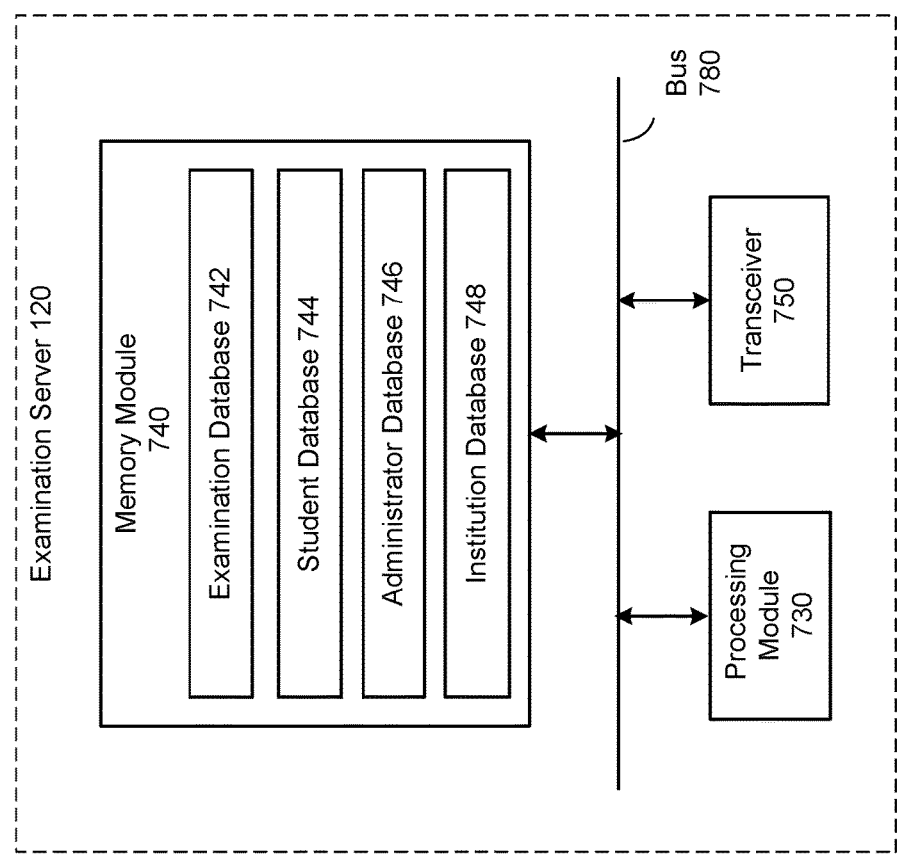
FIG. 7 is a schematic block diagram of examination server in accordance with the present invention.

FIG. 7 is a schematic block diagram of examination server 120. Examination server 120 can include a processing module 730, a transceiver 750, and memory module 740, all connected via bus 780. In various embodiments, the examination server can be localized and store data directed towards a particular class and/or administrator. In such embodiments, the examination server 120 can be coupled to administrator device 160, and processing modules 730, transceiver 750, and memory module 740 can be implemented utilizing administrator processing system 150, transceiver 251, and memory module 241 respectively. In other embodiments, the examination server can service multiple administrators and/or multiple institutions, and correspondingly, memory module 740 can store an examination database 742, student database 744, administrator database 746, and/or institution database 748. In various embodiments, the examination server can include one or more physical server devices located in one or more physical locations, for example, to better facilitate usage by institutions located nationwide and/or globally.

The examination server can store exam data, student data for each student, administrator data for each administrator, and/or institution data for each institution, for example, as one or more relational and/or non-relational databases, which can include databases 742, 744, 746, and/or 748. Exam data for an exam can include an exam identifier and corresponding information such as a course identifier, an academic institution identifier, an administrator identifier, one or more student identifiers, the calculator parameter data, the set of unapproved activities, the received unapproved activity notifications corresponding to one or more of the students, whether the exam has passed or is upcoming, time limit data, calendar data, question data, calculator log data for one or more of the students, answer key data, score data, and/or other information pertaining to the exam. Student data for a student can include a student identifier, one or more academic institution identifiers identifying where the student is/was enrolled, one or more course identifiers indicating courses the student is taking/has taken, one or more exam identifiers indicating exams the student is taking has taken, score and/or grade data, unapproved notification data corresponding to the student over one or more exams, the student's score data for one or more exams, one or more mobile device identifiers indicating one or more mobile devices 140 associated with the student, calculator model preference data, login information, contact information, and/or other information pertaining to the student. Administrator data for an administrator can include an administrator identifier and corresponding information such one or more exam identifiers corresponding to exams the administrator has created and/or proctored, courses identifiers identifying classes and/or subjects the administrator has taught, academic institution identifiers identifying one or more institutions where the administrator has taught, one or more identifiers corresponding to one or more administrator devices 160 associated with the administrator, contact information, login information, and/or other information pertaining to the administrator. Institution data for an institution, such as a school, university, college, school district, statewide or nationwide testing entities such as College Board, American College Testing (ACT), etc. can include identifiers identifying administrators, courses, and/or students associated with the institution. Institutions can create institution accounts to manage such administrators, courses, and/or students. Administrators can create an administrator account to access/manage their corresponding data, and to create examinations. Student accounts can be created and/or managed by administrators or by the students themselves. In various embodiments, institutions, administrators, and/or students must pay a registration fee to subscribe to usage of the system, and payment information including payment methods, balance data, payment history, and/or payment due dates corresponding to each account can be stored as well.

In various embodiments, an administrator can create a new exam via input to the administrator device by indicating the unapproved activity set, calculator parameter data, question data, answer data, and/or time limit data as described previously. The administrator can also replicate or edit old exams stored by the examination server rather than creating an exam from scratch. For example, calculator parameter data, question data, answer data, the unauthorized activity set, timing data, etc., can be reused from a previous exam. For example, an administrator teaching AP Calculus can reuse one of their previously created exams for AP Calculus in a past year, or in some embodiments, can search for and select exam material from an AP Calculus exam created by another administrator at the same or at a different institution. In various embodiments, administrators can select an option indicating whether they wish to make some or all of their tests available for public use, available for use only by a subset of administrators or by a subset of institutions, or for personal use only. In various embodiments, institutions can require standardization of examinations for their courses across multiple years and/or multiple administrators teaching the same course.

A student taking an exam can login to their student account, and select the exam they wish to take, for example, on an interface displayed by the examination processing system via the mobile device. In response, the examination processing system can transmit a request to the examination server indicating the exam, and the examination server can transmit the data pertaining to the exam, including the calculator parameter data, time limit data, unapproved acidity set, etc., in response. In various embodiments, students are first prompted for authentication information to confirm their identity such as a password, an answer to a security questions, a fingerprint scan, a photo of the student to be taken using a camera associated with the mobile device for comparison to the student's identity via facial recognition technology, etc. In various embodiments, a student can search for an exam by inputting the exam name and/or identifier; a name and/or identifier associated with the administrator of the exam; a name and/or identifier associated with an academic class or course corresponding the exam; and/or a name and/or identifier associated with the academic institution. In various embodiments, exams can be searched based on a current location associated with the mobile device. The examination server can return one or more examinations that match the search parameters for evaluation by the student and/or facilitate login to a single exam that matches the search results.

In various embodiments, instead of requiring students to manually search and/or select exams they wish to take, the examination server can automatically determine which students are projected to take a scheduled exam and can transmit notifications, reminders, login prompts, and/or examination data to the corresponding mobile devices. For example, if the exam #12345 for course #123 is scheduled to begin shortly, the examination server will identify all students enrolled in course #123 and automatically send a notification that the examination is about to begin, a prompt to login, and/or the examination data. Similarly, the examination server can store location data corresponding to course #123 and/or exam #12345, such as a building or classroom location, and can automatically transmit the exam data to all mobile devices of registered students in the system located within range of the location based on mobile device location data received from the mobile devices, even if the corresponding students are not otherwise projected to take the exam. In various embodiments, the student can set notification settings indicating whether they would like to be notified when the current time and/or location associated with their mobile device is within range of an exam time and/or exam location for exams which they are projected to take. In various embodiments, the notification settings can also include reminder settings, for example, enabling alerts to be displayed on the student's mobile device indicating that an exam #12345 is coming up in 2 days for course #123 in building #11, room #175, at 3 pm.

In various embodiments, the examination server, before or at the start of an exam, can compare the students who are successfully logged and/or taking the exam to the set of students who are projected to take the exam, for example, based on the students enrolled in the course associated with the exam. The examination server can then identify one or more students who are projected to take the examination but have not yet logged in. These identified missing students can be notified automatically via an alert sent to their mobile device that they need to login to the exam. A notification that includes the identified missing students can also be sent to the administrator and/or institution.

In various embodiments, an examination processing system for use with a corresponding mobile device associated with a user taking an examination is operable to receive calculator parameter data from an examination server via a network. An interactive calculator interface is displayed on the mobile device, and the interactive calculator interface performs an approved set of calculator functions indicated by the calculator parameter data. An unapproved activity notification is generated for transmission to the examination server via the network in response to detecting unapproved activity on the mobile device.

In various embodiments, the unapproved activity includes exiting a mobile device application associated with the examination processing system. In various embodiments, the unapproved activity includes accessing at least one of: a texting service, a social media application, an internet browser, or an email account. In various embodiments, an examination identifier is received via user input to the mobile device. A request is transmitted to the examination server to send the calculator parameter data corresponding to the examination identifier. In various embodiments, calculator log data is generated for transmission to the examination server corresponding to input to the interactive calculator interface by the user taking the examination.

In various embodiments, the calculator parameter data further includes time limit data, and the interactive calculator interface is active for a duration based on the time limit data. In various embodiments, the time limit data includes a first time segment and a second time segment. The interactive calculator interface only performs a first subset of the set of approved calculator functions for a first duration corresponding to the first time segment, and the interactive calculator interface only performs a second subset of the set of approved calculator functions for a second duration corresponding to the second time segment. The set-theoretic difference of the first subset and the second subset is non-null.

In various embodiments, examination question data is received from the examination server via the network. An interactive question interface is displayed on the mobile device, and the interactive question interface includes a plurality of examination questions indicated by the examination question data. A plurality of responses corresponding to the plurality of examination questions are received via the interactive question interface. Examination response data is generated that includes the plurality of responses for transmission to the examination server via the network. In various embodiments, the plurality of examination questions are sequentially displayed one at a time, and the interactive question interface advances to the next question in response to receiving a one of the plurality of responses corresponding to a one of the plurality of examination questions currently displayed by the interactive question interface. In various embodiments, the plurality of examination questions includes a first examination question and a second examination question. The interactive calculator interface only performs a first subset of the set of approved calculator functions until the interactive question interface advances to the second examination question, and the interactive calculator interface only performs a second subset of the set of approved calculator functions after the interactive question interface has advanced to the second examination question. The set-theoretic difference of the first subset and the second subset is non-null. In various embodiments, the examination question data includes answer key data. Examination score data is generated based on comparing the plurality of responses to the answer key data. The examination score data is displayed on the mobile device.

In various embodiments, the interactive calculator interface corresponds to a one of a plurality of calculator model options selected by the user taking the examination via user input to the mobile device. In various embodiments, the plurality of calculator model options corresponds to a plurality of physical calculator models, and the interactive calculator interface replicates a one of the plurality of physical calculator models. The approved set of calculator functions performed by the interactive calculator interface is a subset of a full set of calculator functions corresponding to the one of the plurality of physical calculator models.

In various embodiments, the examination server receives the calculator parameter data via the network from a device associated with an examination administrator based on user input to the device by the examination administrator. In various embodiments, the examination server transmits the unapproved activity notification to a device associated with an examination administrator via the network.

Figure 8:
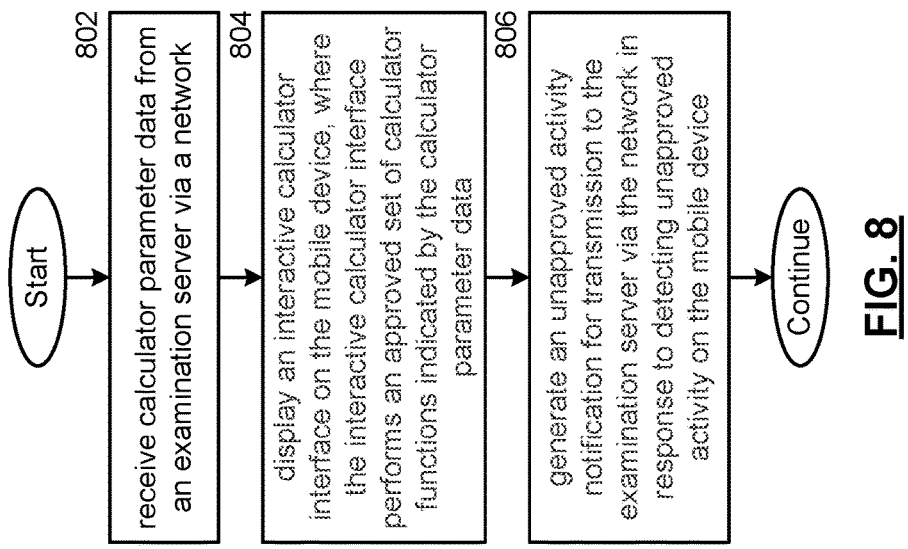
FIG. 8 is a flowchart representation of a method in accordance with an embodiment of the present invention.

FIG. 8 is a flowchart illustrating an example of administering an examination. In particular, a method is presented for use in conjunction with one or more functions and features described in conjunction with FIGS. 1-7 for execution by an examination processing system that includes at least one processor and memory that stores instructions that configure the processor or processors to perform the steps described below. Step 802 includes receiving calculator parameter data from an examination server via a network. Step 804 includes displaying an interactive calculator interface on the mobile device, where the interactive calculator interface performs an approved set of calculator functions indicated by the calculator parameter data. Step 806 includes generating an unapproved activity notification for transmission to the examination server via the network in response to detecting unapproved activity on the mobile device.

In various embodiments, the unapproved activity includes exiting a mobile device application associated with the examination processing system. In various embodiments, the unapproved activity includes accessing at least one of: a texting service, a social media application, an internet browser, or an email account. In various embodiments, an examination identifier is received via user input to the mobile device. A request is transmitted to the examination server to send the calculator parameter data corresponding to the examination identifier. In various embodiments, calculator log data is generated for transmission to the examination server corresponding to input to the interactive calculator interface by the user taking the examination.

In various embodiments, the calculator parameter data further includes time limit data, and the interactive calculator interface is active for a duration based on the time limit data. In various embodiments, the time limit data includes a first time segment and a second time segment. The interactive calculator interface only performs a first subset of the set of approved calculator functions for a first duration corresponding to the first time segment, and the interactive calculator interface only performs a second subset of the set of approved calculator functions for a second duration corresponding to the second time segment. The set-theoretic difference of the first subset and the second subset is non-null.

In various embodiments, examination question data is received from the examination server via the network. An interactive question interface is displayed on the mobile device, and the interactive question interface includes a plurality of examination questions indicated by the examination question data. A plurality of responses corresponding to the plurality of examination questions are received via the interactive question interface. Examination response data is generated that includes the plurality of responses for transmission to the examination server via the network. In various embodiments, the plurality of examination questions are sequentially displayed one at a time, and the interactive question interface advances to the next question in response to receiving a one of the plurality of responses corresponding to a one of the plurality of examination questions currently displayed by the interactive question interface. In various embodiments, the plurality of examination questions includes a first examination question and a second examination question. The interactive calculator interface only performs a first subset of the set of approved calculator functions until the interactive question interface advances to the second examination question, and the interactive calculator interface only performs a second subset of the set of approved calculator functions after the interactive question interface has advanced to the second examination question. The set-theoretic difference of the first subset and the second subset is non-null. In various embodiments, the examination question data includes answer key data. Examination score data is generated based on comparing the plurality of responses to the answer key data. The examination score data is displayed on the mobile device.

In various embodiments, the interactive calculator interface corresponds to a one of a plurality of calculator model options selected by the user taking the examination via user input to the mobile device. In various embodiments, the plurality of calculator model options corresponds to a plurality of physical calculator models, and the interactive calculator interface replicates a one of the plurality of physical calculator models. The approved set of calculator functions performed by the interactive calculator interface is a subset of a full set of calculator functions corresponding to the one of the plurality of physical calculator models.

In various embodiments, the examination server receives the calculator parameter data via the network from a device associated with an examination administrator based on user input to the device by the examination administrator. In various embodiments, the examination server transmits the unapproved activity notification to a device associated with an examination administrator via the network.

In various embodiments, a non-transitory computer readable storage medium includes at least one memory section that stores operational instructions that, when executed by an examination processing system that includes a processor and a memory, causes the examination processing system to receive calculator parameter data from an examination server via a network. An interactive calculator interface is displayed on a corresponding mobile device, where the interactive calculator interface performs an approved set of calculator functions indicated by the calculator parameter data. An unapproved activity notification is generated for transmission to the examination server via the network in response to detecting unapproved activity on the mobile device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An examination processing system for use with a corresponding mobile device associated with a user taking an examination, the examination processing system operable to:
   receive calculator parameter data from an examination server via a network;
   display an interactive calculator interface on the mobile device, wherein the interactive calculator interface performs an approved set of calculator functions indicated by the calculator parameter data;
   generate an unapproved activity notification for transmission to the examination server via the network in response to detecting unapproved activity on the mobile device;
   receive examination question data from the examination server via the network;
   display an interactive question interface on the mobile device, wherein the interactive question interface includes a plurality of examination questions indicated by the examination question data;
   receive a plurality of responses corresponding to the plurality of examination questions via the interactive question interface; and
   generate examination response data that includes the plurality of responses for transmission to the examination server via the network;
   wherein the calculator parameter data further includes time limit data, and wherein the interactive calculator interface is active for a duration based on the time limit data;
   wherein the time limit data includes a first time segment and a second time segment, wherein the interactive calculator interface only performs a first subset of the set of approved calculator functions for a first duration corresponding to the first time segment, wherein the interactive calculator interface only performs a second subset of the set of approved calculator functions for a second duration corresponding to the second time segment, and wherein a set-theoretic difference of the first subset and the second subset is non-null;
   wherein the plurality of examination questions are sequentially displayed one at a time, and wherein the interactive question interface advances to the next question in response to receiving a one of the plurality of responses corresponding to a one of the plurality of examination questions currently displayed by the interactive question interface; and
   wherein the plurality of examination questions includes a first examination question and a second examination question, wherein the interactive calculator interface only performs a third subset of the set of approved calculator functions until the interactive question interface advances to the second examination question, wherein the interactive calculator interface only performs a fourth subset of the set of approved calculator functions after the interactive question interface has advanced to the second examination question, and wherein a set-theoretic difference of the third subset and the fourth subset is non-null.

2. The examination processing system of claim 1, wherein the unapproved activity includes exiting a mobile device application associated with the examination processing system.

3. The examination processing system of claim 1, wherein the unapproved activity includes accessing at least one of: a texting service, a social media application, an internet browser, or an email account.

4. The examination processing system of claim 1, further operable to:
   receive an examination identifier via user input to the mobile device; and
   transmit a request to the examination server to send the calculator parameter data corresponding to the examination identifier.

5. The examination processing system of claim 1, further operable to generate calculator log data for transmission to the examination server corresponding to input to the interactive calculator interface by the user taking the examination.

6. The examination processing system of claim 5, further operable to:
   receive examination score data from the examination server, wherein the examination score data is generated based on comparing an ordered list of calculator input of the calculator log data to an ordered list of calculator functions of solution method data stored by the examination server; and
   display the examination score data on the mobile device.

7. The examination processing system of claim 1, wherein the calculator parameter data further indicates a proper subset of the approved set of calculator functions that corresponds to a penalty inducing set of calculator functions, further operable to:
   generate penalty data in response to determining at least one of the penalty inducing set of calculator functions was performed during the examination; and
   display examination score data on the mobile device, wherein generating the examination score data inducing a penalty based on the penalty data.

8. The examination processing system of claim 1, wherein the examination question data includes answer key data, further operable to:

generate examination score data based on comparing the plurality of responses to the answer key data; and display the examination score data on the mobile device.

9. The examination processing system of claim 1, wherein the interactive calculator interface corresponds to a one of a plurality of calculator model options selected by the user taking the examination via user input to the mobile device.

10. The examination processing system of claim 9, wherein the plurality of calculator model options corresponds to a plurality of physical calculator models, wherein the interactive calculator interface replicates a one of the plurality of physical calculator models, and wherein the approved set of calculator functions performed by the interactive calculator interface is a subset of a full set of calculator functions corresponding to the one of the plurality of physical calculator models.

11. The examination processing system of claim 1 wherein the examination server receives the calculator parameter data via the network from a device associated with an examination administrator based on user input to the device by the examination administrator.

12. The examination processing system of claim 1 wherein the examination server transmits the unapproved activity notification to a device associated with an examination administrator via the network.

13. A method for execution by an examination processing system that includes a processor for use with a corresponding mobile device associated with a user taking an examination, the method comprises:
receiving calculator parameter data from an examination server via a network;
displaying an interactive calculator interface on the mobile device, wherein the interactive calculator interface performs an approved set of calculator functions indicated by the calculator parameter data;
generating an unapproved activity notification for transmission to the examination server via the network in response to detecting unapproved activity on the mobile device;
receiving examination question data from the examination server via the network;
displaying an interactive question interface on the mobile device, wherein the interactive question interface includes a plurality of examination questions indicated by the examination question data;
receiving a plurality of responses corresponding to the plurality of examination questions via the interactive question interface; and
generating examination response data that includes the plurality of responses for transmission to the examination server via the network;
wherein the calculator parameter data further includes time limit data, and wherein the interactive calculator interface is active for a duration based on the time limit data;
wherein the time limit data includes a first time segment and a second time segment, wherein the interactive calculator interface only performs a first subset of the set of approved calculator functions for a first duration corresponding to the first time segment, wherein the interactive calculator interface only performs a second subset of the set of approved calculator functions for a second duration corresponding to the second time segment, and wherein a set-theoretic difference of the first subset and the second subset is non-null;
wherein the plurality of examination questions are sequentially displayed one at a time, and wherein the interactive question interface advances to the next question in response to receiving a one of the plurality of responses corresponding to a one of the plurality of examination questions currently displayed by the interactive question interface; and
wherein the plurality of examination questions includes a first examination question and a second examination question, wherein the interactive calculator interface only performs a third subset of the set of approved calculator functions until the interactive question interface advances to the second examination question, wherein the interactive calculator interface only performs a fourth subset of the set of approved calculator functions after the interactive question interface has advanced to the second examination question, and wherein a set-theoretic difference of the third subset and the fourth subset is non-null.

14. The method of claim 13, further comprising:
generating calculator log data for transmission to the examination server corresponding to input to the interactive calculator interface by the user taking the examination.

15. The method of claim 13, wherein the interactive calculator interface performs only the first subset of the set of approved calculator functions in a plurality of non-consecutive time segments selected by the user via user input the interactive calculator interface, and wherein a total time of the plurality of non-consecutive time segments does not exceed the first duration.

16. A non-transitory computer readable storage medium comprises:
at least one memory section that stores operational instructions that, when executed by an examination processing system that includes a processor and a memory, causes the examination processing system to:
receive calculator parameter data from an examination server via a network;
display an interactive calculator interface on a corresponding mobile device, wherein the interactive calculator interface performs an approved set of calculator functions indicated by the calculator parameter data;
generate an unapproved activity notification for transmission to the examination server via the network in response to detecting unapproved activity on the mobile device;
receive examination question data from the examination server via the network;
display an interactive question interface on the mobile device, wherein the interactive question interface includes a plurality of examination questions indicated by the examination question data;
receive a plurality of responses corresponding to the plurality of examination questions via the interactive question interface; and
generate examination response data that includes the plurality of responses for transmission to the examination server via the network;
wherein the calculator parameter data further includes time limit data, and wherein the interactive calculator interface is active for a duration based on the time limit data;
wherein the time limit data includes a first time segment and a second time segment, wherein the interactive calculator interface only performs a first subset of the set of approved calculator functions for a first duration corresponding to the first time segment, wherein the interactive calculator interface only performs a second subset of the set of approved calculator functions for a second duration corresponding to the second time segment, and wherein a set-theoretic difference of the first subset and the second subset is non-null;

wherein the plurality of examination questions are sequentially displayed one at a time, and wherein the interactive question interface advances to the next question in response to receiving a one of the plurality of responses corresponding to a one of the plurality of examination questions currently displayed by the interactive question interface; and wherein the plurality of examination questions includes a first examination question and a second examination question, wherein the interactive calculator interface only performs a third subset of the set of approved calculator functions until the interactive question interface advances to the second examination question, wherein the interactive calculator interface only performs a fourth subset of the set of approved calculator functions after the interactive question interface has advanced to the second examination question, and wherein a set-theoretic difference of the third subset and the fourth subset is non-null.

* * * * *